United States Patent

Sone et al.

Patent Number: 5,529,034
Date of Patent: Jun. 25, 1996

[54] VALVE TIMING CONTROL APPARATUS FOR ENGINE

[75] Inventors: Shigeru Sone; Tadahisa Naganawa, both of Toyota; Senji Kato, Aichi; Kouji Endou, Mizunami; Nobuhisa Ohkawa; Atsushi Gotou, both of Toyota, all of Japan

[73] Assignee: Toyota Jidosha Kabushiki Kaisha, Toyota, Japan

[21] Appl. No.: 334,709

[22] Filed: Nov. 4, 1994

[30] Foreign Application Priority Data

Nov. 5, 1993 [JP] Japan .................................. 5-277161

[51] Int. Cl.⁶ .................................................. F01L 1/34
[52] U.S. Cl. ...................... 123/90.17; 123/90.15; 123/90.31
[58] Field of Search ............... 123/90.15, 90.16, 123/90.17, 90.31

[56] References Cited

U.S. PATENT DOCUMENTS 4,995,351  2/1991  Ohkubo et al. .
5,333,577  8/1994  Shinojima .................... 123/90.17
5,417,187  5/1995  Meyer et al. .................. 123/90.17

FOREIGN PATENT DOCUMENTS

60-88013 U  6/1985  Japan .
62-59707 U  4/1987  Japan .

Primary Examiner—Weilun Lo
Attorney, Agent, or Firm—Kenyon & Kenyon

[57] ABSTRACT

A cam shaft of an engine is provided with a timing change mechanism (VVT) which is driven by hydraulic pressure to alter the timing of a intake valve (valve timing). This VVT is controlled to change the valve overlap of the intake valve and an exhaust valve, thereby adjusting the suction and exhaust in and from a combustion chamber. To control the VVT, an electronic control unit (ECU) computes a target value for the valve timing in accordance with the running condition of the engine and controls the supply of the hydraulic pressure to the VVT based on the target value. The ECU determines the level of the actual hydraulic pressure given to the VVT. When the actual valve timing does not lie in a predetermined range with respect to the target value, the ECU determines that an abnormality has occurred in the VVT, and executes a predetermined fail safe routine. When the hydraulic pressure is equal to or smaller than a reference value, the ECU suppresses VVT malfunction determinations.

16 Claims, 9 Drawing Sheets

VALVE TIMING CONTROL APPARATUS FOR ENGINE

BACKGROUND OF THE INVENTION

1. Field of the Invention

The present invention relates generally to a valve timing control apparatus and in particular to a valve timing control apparatus having a timing change mechanism for changing the timing of at least one of the intake and exhaust valves of an engine in accordance with the running condition of the engine.

2. Description of the Related Art

Figure 8:
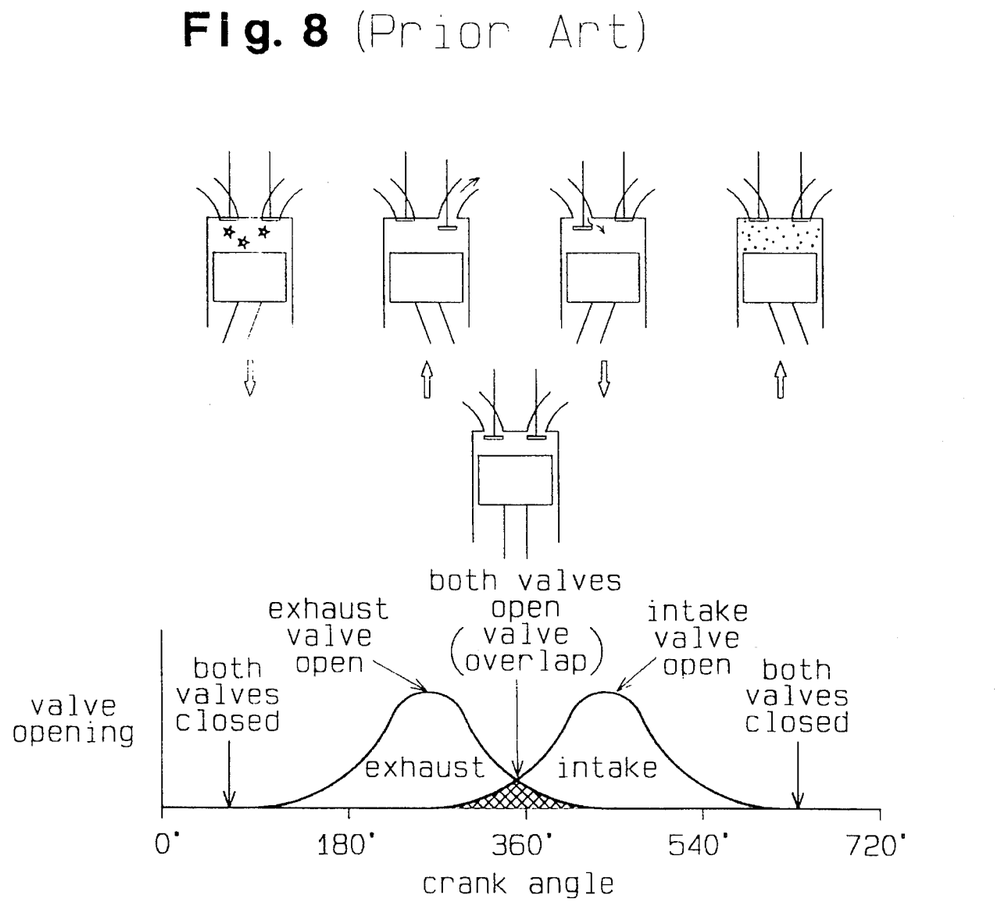
FIG. 8 illustrates the relationship between valve operation and a valve overlap.

In the conventional combustion engine, the intake valve and exhaust valve operate to open and close air-intake and exhaust passages connected to the individual combustion chambers. The timing of both types of valves is controlled by the rotational phase of the crankshaft, which is in turn determined by the reciprocal movement of the pistons. The amount of intake or exhaust gas in any one of the combustion chambers depends on the angle of a throttle valve provided separately in the engine's air-intake passage, or generally on the speed of the engine. As shown in FIG. 8, during a cycle where the crankshaft angle changes 720 degrees, a short period of time exists when both of the intake and exhaust valves of a cylinder open at the same time. This so-called valve overlap helps to scavenge burned gases out of the combustion chamber of the cylinder and to pull fresh air and fuel into the combustion chamber.

Figure 9:
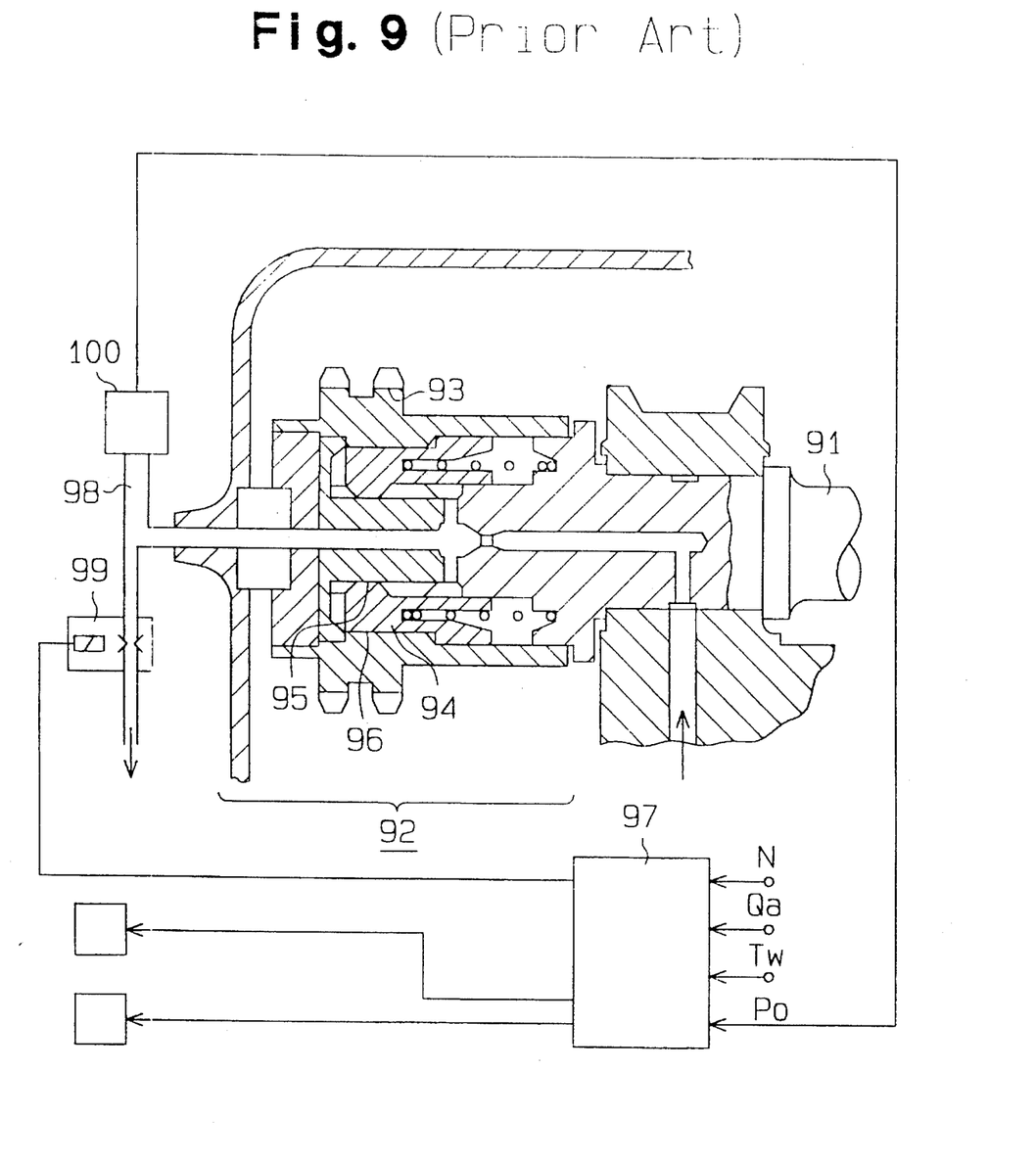
FIG. 9 is a structural diagram showing a conventional valve timing control apparatus.

Various apparatuses are available to ensure a variable valve timing in order to control the intake and exhaust amounts in the combustion chamber with a greater degree of freedom. Japanese Unexamined Utility Model Publication No. 62-59707 discloses one example of such an apparatus. As illustrated in FIG. 9, a cam shaft 91 in this apparatus drives intake and exhaust valves (neither shown). A variable valve timing mechanism (VVT) 92 disposed at the distal end of the cam shaft 91 operates using the pressure of the lubricating oil of the engine. The VVT 92 includes a cylindrical driving wheel 93 and a piston member 94, provided between this wheel 93 and the camshaft 91. The driving wheel 93 rotates on the power received from a crankshaft (not shown). The piston member 94 is coupled to the cam shaft 91 by a spline tooth 95. The piston member 94 is also coupled to the driving wheel 93 by another spline tooth 96. One of the spline teeth 95 and 96 is a helical tooth. As the driving wheel 93 rotates, the torque is transmitted via the piston member 94 to the cam shaft 91. When hydraulic pressure is applied to the piston member 94 to move this member 94 in the axial direction, the cam shaft 91 rotates relative to the driving wheel 93. By controlling the supply of the hydraulic pressure to the piston member 94 in accordance with the running condition of the engine, therefore, the piston member 94 moves inside the driving wheel 93 in the axial direction. As a result, the rotational phase of the cam shaft 91 with respect to the driving wheel 93 changes, altering the valve timing and adjusting the level of the valve overlap.

In this apparatus, a control unit 97 controls the supply of the hydraulic pressure to the VVT 92. The control unit 97 computes a target hydraulic pressure to supply the VVT 92 in accordance with the running condition of the engine. To obtain this target value, the control unit 97 controls the angle of an electromagnetic valve 99 provided in each hydraulic pressure passage 98. The angle control adjusts the level of the hydraulic pressure applied to the VVT 92 to change the rotational phase of the cam shaft 91.

A pressure sensor 100 provided in the hydraulic pressure passage 98 in this apparatus detects the level of the hydraulic pressure supplied to the VVT 92. The control unit 97 performs feedback control of the angle of the electromagnetic valve 99 in such a manner that the actual value of the hydraulic pressure detected by the pressure sensor 100 matches the target value of the hydraulic pressure according to the running condition of the engine. Through this control, the level of the valve overlap is controlled based on the running condition of the engine. Further, the control unit 97 computes the difference between the actual value of the hydraulic pressure and the target value. When the difference exceeds a predetermined value, the control unit 97 determines that an abnormality has occurred in the VVT 92 and restricts the subsequent application of the hydraulic pressure to the VVT 92. The control unit 97 stores the result of the decision in a backup memory so that this data can be used anytime for the maintenance of the VVT 92.

Another type of control apparatus has a sensor for detecting the rotational angle of the cam shaft (cam angle). In this apparatus, the control unit performs feedback control of the electromagnetic valve in such a manner that the actual value of the cam angle detected by the sensor matches the target value which is computed in accordance with the running condition of the engine.

Since both conventional control apparatuses simply perform feedback control of the electromagnetic valve in such a manner that the actual value of the hydraulic pressure or cam angle matches its target value, they have the following shortcomings. Both apparatuses use the lubricating oil to provide the hydraulic pressure to drive the VVT. Generally, the pressure given to the lubricating oil in the engine is obtained by the oil pump that is driven in responsive to the engine. Therefore, the hydraulic pressure applied to the VVT varies in accordance with a change in the engine speed. More specifically, when the engine speed is low in the two conventional apparatuses, the hydraulic pressure supplied to the VVT may drop or become low, delaying the response or actuation of the VVT. At a low engine speed, therefore, a longer time is required to change the cam angle to the target value than is needed at high engine speeds. It is likely that at low engine speeds or with low hydraulic pressure, complete actuation of the VVT will not occur within the time specified or allotted for its operation. Should this happen, the actual and target hydraulic pressure values will fail to converge, leaving the cam angle unacceptably large despite the proper functioning of the VVT. The control unit may, in response, determine that an abnormality has occurred in the VVT, and may consequently restrict the VVT's actuation. Unfortunately, with a restricted or nonfunctioning VVT, accurate valve timing can not be assured. This could jeopardize or cause the deterioration of the engine's operating conditions.

To overcome the above problems, an increased time period could be used to determine whether abnormalities exist in the VVT. Such an increased time period would allow the actual hydraulic pressure to reach or converge to the target pressure despite the operation of the VVT under low hydraulic pressure conditions. Despite the advantage of being able to accurately diagnose the functionality of the VVT, increasing the convergence time presents the following problem.

Should a malfunction develop in a VVT mechanism, in which convergence of actual hydraulic pressure to a preset target value was allowed to occur over a lengthened period of time, the VVT malfunction would not be immediately detectable by the unit controlling the VVT mechanism. In fact the control unit would not be able to detect such a malfunction until after the period of time set for such a convergence. Therefore, increasing the time needed for the actual hydraulic pressure to converge to a target value is not an effective way to determine VVT functionality.

SUMMARY OF THE INVENTION

Accordingly, it is a primary objective of the present invention to provide a valve timing control apparatus, which includes a mechanism capable of variable valve timing under various engine operating conditions in such a way that permits the detection of abnormalities in the timing mechanism. This control apparatus prevents faulty diagnosis of VVT abnormalities even when engine operating conditions are such that prevent quick timing changes, i.e., under low engine operating speeds.

To achieve the above and other objects and in accordance with the purpose of the present invention, a valve timing control apparatus for engine is provided. The apparatus includes a combustion chamber communicating with an air-intake passage and an air-exhaust passage. The air-intake passage is arranged to introduce air to the chamber through a throttle valve for regulating an amount of the air with an opening degree thereof. The air-exhaust passage is arranged to exhaust gas from the chamber, both passages respectively having an intake valve and an exhaust valve therein. The intake and exhaust valves alternately and selectively opens and closes, and simultaneously opens during a valve overlap period, in synchronism with a rotation of a crankshaft to open the passages to the combustion chamber, wherein said apparatus controls a valve timing of the intake valve and/or the valve timing of the exhaust valve in accordance with a running condition of the engine. The apparatus further includes an adjusting device for adjusting the valve timing of the intake valve and/or the valve timing of the exhaust valve, an actuating device for actuating the adjusting device, first detecting device for detecting an actual value of the valve timing adjusted by the adjusting device, a second detecting device for detecting a running condition of the engine, a computing device for computing a target value of the valve timing based on the detected running condition of the engine, a control device for controlling the actuating device to adjust the valve timing based on the computed target value and a third detecting device for detecting a magnitude of the actuating force applied to the adjusting device by the actuating device, a comparing device for comparing the actual value of the valve timing and the target value of the valve timing, a determining device for determining a malfunction of the adjusting device when the actual value differs from the target value by a predetermined value and a discontinuing device for discontinuing the operation of the determining device when the actuating force detected by the third detecting device is less than a predetermined value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 1 through 4 illustrate a first embodiment of the present invention adapted to a gasoline engine system.

FIGS. 5 and 6 illustrate a second embodiment of the present invention adapted to a gasoline engine system.

DETAILED DESCRIPTION OF THE PREFERRED EMBODIMENTS

Valve timing control apparatuses for an engine according to a first and second embodiments of the present invention will now be described. The basic mechanical and electrical structures of the valve timing control apparatus embodying this invention will be discussed in the explanation of the first embodiment. Only those aspects of the second embodiment which differ in structure from those on the first embodiment will be described in the second embodiment.

First Embodiment

With reference to FIGS. 1 through 4, a detailed description will now be given of a valve timing control apparatus for an engine according to the first embodiment of the present invention, as adapted for a gasoline engine of a vehicle.

Figure 1:
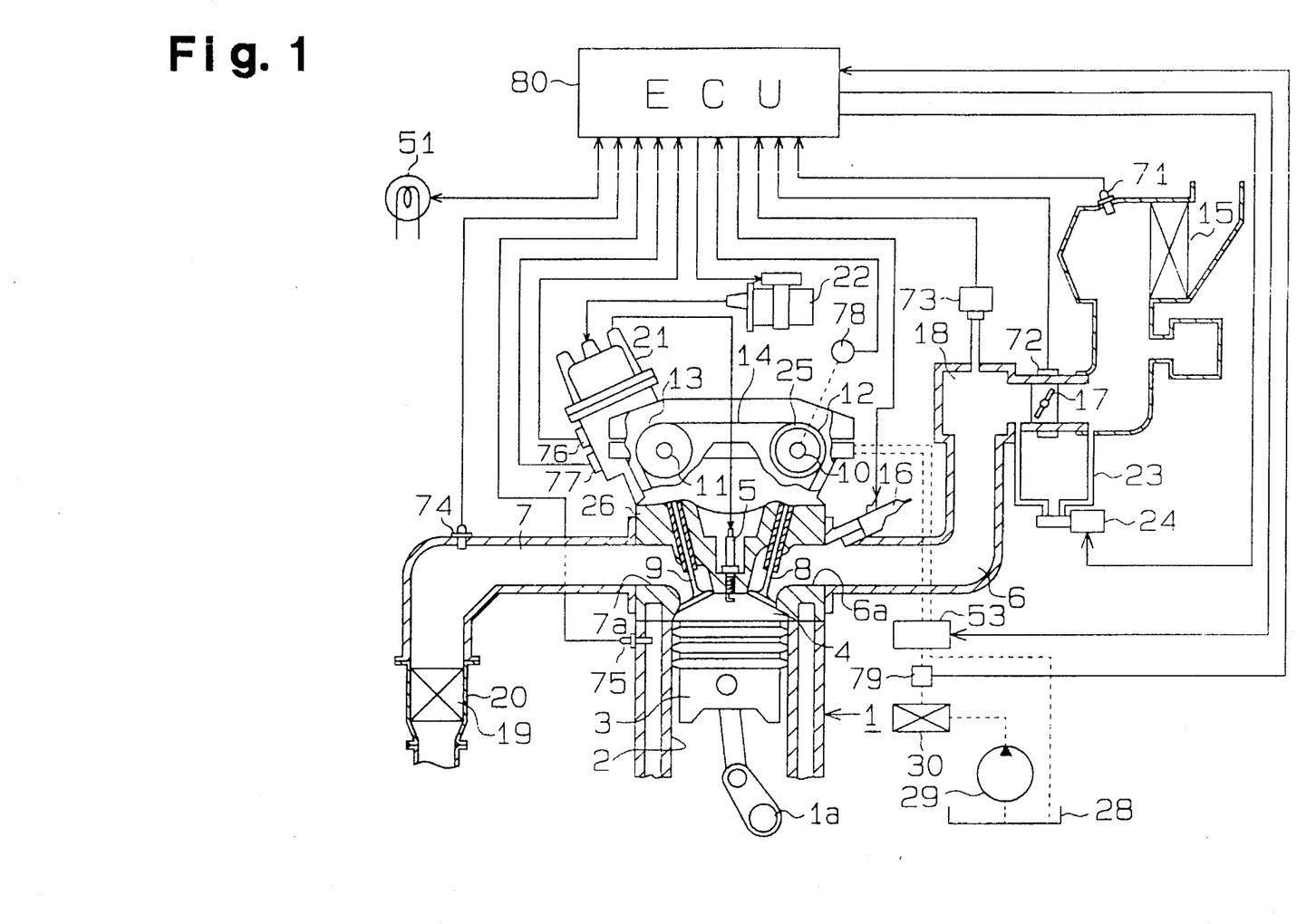
FIG. 1 is a schematic structural diagram illustrating the engine system including a valve timing control apparatus.

FIG. 1 illustrates the schematic structure of a valve timing control apparatus for an engine. An engine 1 is provided with a plurality of cylinders 2 (only one shown), each of which contains a piston 3 capable of reciprocating in the cylinder 2. A combustion chamber 4 is located above the piston 3 in each of the cylinders 2. A plurality of ignition plugs 5, provided in association with the individual combustion chambers 4, operate to produce high voltage sparks when supplied with an external voltage. An air-intake passage 6 and an exhaust passage 7 respectively communicate with an intake port 6a and an exhaust port 7a, provided in association with each combustion chamber 4. An intake valve 8 and an exhaust valve 9, also provided in association with each combustion chamber 4, respectively open and close to allow the ports 6a and 7a to communicate with passages 6 and 7. Those valves 8 and 9 function based on the rotations of different cam shafts 10 and 11. A timing belt 14 couples a pair of timing pulleys 12 and 13, provided at the distal ends of the cam shafts 10 and 11 respectively, to a crankshaft 1a.

Upon operation of the engine 1, the timing belt 14 and pulleys 12, 13 transmit the torque produced by crankshaft 1a to the cam shafts 10 and 11. The respective rotation of cam shafts 10 and 11 actuate the valves 8 and 9. Valves 8 and 9 thus open and close at predetermined times in synchronism either with the rotation of the crankshaft 1a or with the various strokes made by the pistons, i.e., the suction stroke, the compression stroke, the combustion and expansion stroke, and the exhaust stroke.

An air cleaner 15 provided at the inlet side of the air-intake passage 6 cleans the outside air taken into the air-intake passage 6. Injectors 16 provided near the respective intake ports 6a inject fuel into the air-intake passage 6. When the engine 1 runs, the air is led via the air cleaner 15 into the air-intake passage 6. Fuel, injected from each injector 16, mixes with the air in the air-intake passages 6. This air-fuel mixture is then fed into the associated combustion chamber 4 during a suction stroke when the associated intake port 6a is opened by the intake valve 8. The air-fuel mixture supplied into the combustion chamber 4 is ignited and burned by the associated ignition plug 5. As a result, the piston 3 moves to rotate the crankshaft 1a, generating engine output power. Next, during the exhaust stroke, exhaust valve 9 operates to open exhaust port 7a, thereby controlling the discharge of burnt gases, from the combustion chamber 4 to the exhaust passage 7.

A throttle valve 17 provided midway in the air-intake passage 6 functions in response to the manipulation of an acceleration pedal (not shown). The amount of air supplied to the air-intake passage 6, i.e., the air-intake amount, can be controlled by adjusting the angle of the valve 17. A surge tank 18 provided downstream of the throttle valve 17 helps to suppress suction pulsation. An air temperature sensor 71, provided in the vicinity of the air cleaner 15, detects an intake-air temperature THA and outputs a signal corresponding to the detected value. A throttle sensor 72, provided in the vicinity of the throttle valve 17, detects the angle, TA, of the valve 17 (throttle angle) and outputs a signal corresponding to the detected value. A manifold pressure sensor 73, provided in the surge tank 18, detects a manifold pressure PM and outputs a signal corresponding to the detected value.

A catalytic converter 20, provided midway in the exhaust passage 7, cleans the exhaust gas with an incorporated rhodium catalytic converter 19. Further, an oxygen sensor 74, provided midway in the exhaust passage 7, detects the oxygen density in the exhaust gas and outputs a signal corresponding to the detected value. A coolant temperature sensor 75 detects the temperature, THW, of the coolant in the engine 1 and outputs a signal corresponding to the detected value.

An ignition coil 22 supplies a high voltage ignition signal to a distributor 21 which distributes the ignition signal to the individual ignition plugs 5 in synchronism with the rotation of the crankshaft 1a or a change in crank angle. Consequently, the ignition timing of each ignition plug 5 is determined by the timing at which a high voltage is output from the igniter 22.

A rotor (not shown) incorporated in the distributor 21 rotates in synchronism with the rotation of the crankshaft 1a via the cam shaft 11. An engine speed sensor 76 provided in the distributor 21 detects the rotational speed of the engine 1 (engine speed) NE and outputs a signal corresponding to the detected value. A timing sensor 77 provided in the distributor 21 detects the reference position, GP, of the crank angle at a predetermined rate in accordance with the rotation of the rotor and outputs a signal corresponding to the detected value. In this embodiment, the crankshaft 1a rotates twice for a sequence of operational strokes of the engine 1, and the engine speed sensor 76 detects the crank angle at a rate of 30 degrees per pulse. The timing sensor 77 detects the crank angle at a rate of 360 degrees per pulse.

In this embodiment, a bypass passage 23 provided in the air-intake passage 6 bypasses the throttle valve 17 and connects the upstream side of the valve 17 to the downstream side. An idle speed control valve (ISCV) 24 of a linear solenoid type provided in the bypass passage 23 serves to stabilize the idling at which time the throttle valve 17 is fully closed. When a step motor incorporated in this ISCV 24 is driven based on a predetermined control signal, the ISCV 24 operates to adjust the degree of the opening of the bypass passage 23 and the release time. This controls the amount of air led into the combustion chamber 4.

In this embodiment, a variable valve timing mechanism (VVT) 25, which is provided in the timing pulley 12, serves to alter the actuation timing of the intake valve 8. The structure of the VVT 25 will be described below in detail with reference to FIG. 2. A journal 10a of the cam shaft 10 is rotatably supported between a cylinder head 26 and a bearing cap 27 of the engine 1. The VVT 25 is integrally provided with the timing pulley 12 at the distal end of the cam shaft 10.

Figure 2:
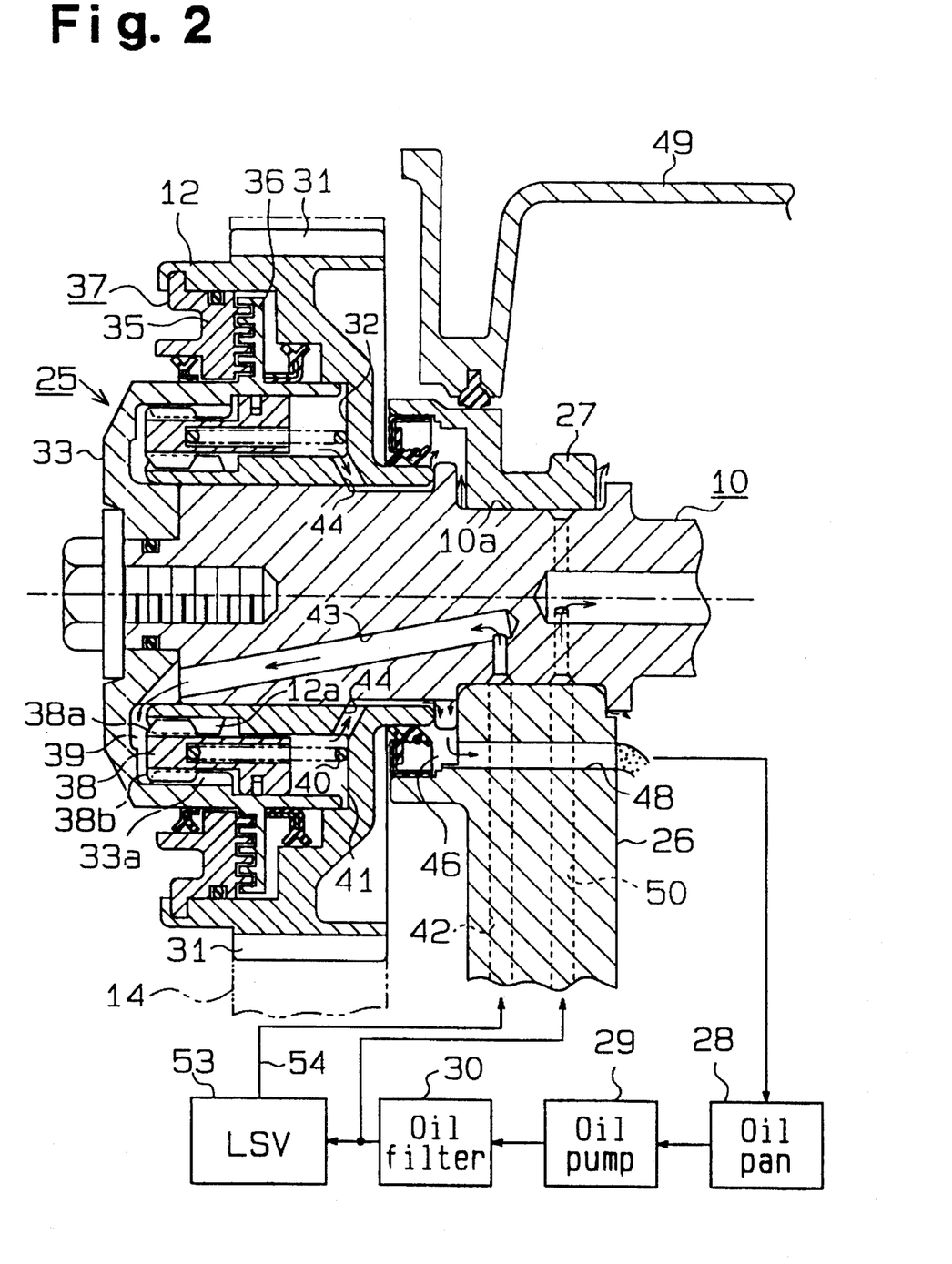
FIG. 2 is a cross section showing the structures of a variable valve timing mechanism (VVT), etc.

The pulley 12 has a plurality of external teeth 31 on its outer surface and a recess 32 on one side. The timing belt 14 is put around the external teeth 31. A cap 33 fixed to the distal end of the cam shaft 10 covers the recess 32. A viscous coupling 37, provided for a shock absorbing purpose between the opening end of the recess 32 and the outer surface of the cap 33, comprises an outer plate 35, securely pressed fit in the recess 32, and an inner plate 36 integrally formed with the cap 33.

A ring gear 38, intervening between the cap 33 and the cam shaft 10, has a plurality of helical teeth 38a on the inner surface and a plurality of helical teeth 38b on the outer surface. Those helical teeth 38a and 38b respectively engage with a helical tooth 12a of the pulley 12 and a helical tooth 33a of the cap 33.

Therefore, as the torque of the cam shaft 1a is transmitted to the pulley 12 via the timing belt 14, the ring gear 38 rotates via the helical teeth 12a and 38a. Further, the cap 33 rotates via the helical teeth 33a and 38b, rotating the cam shaft 10. By moving the ring gear 38 in the axial direction of the cam shaft 10 (horizontally in FIG. 2) at this time, the cam shaft 10 rotates relative to the pulley 12 based on the action of the helical teeth 12a, 33a, 38a and 38b. As a result, the rotational phase of the cam shaft 10 (cam rotational phase) changes, altering the valve timing of the intake valve 8. At the time the cam shaft 10 rotates relative to the pulley 12, the rattling of the ring gear 38, etc., which is caused by the backlash of the helical teeth 12a, 33a, 38a and 38b, is absorbed by the coupling 37, suppressing the occurrence of abnormal sounds or shocks.

To move the ring gear 38 in the axial direction, hydraulic pressure is supplied to a hydraulic pressure chamber 39 formed in the recess 32 of the pulley 12 between the bottom of the cap 33 and the axial end of the ring gear 38. A spring 40 provided in a spring chamber opposite the hydraulic pressure chamber 39 urges the ring gear 38 against the force of the hydraulic pressure in the hydraulic pressure chamber 39. Oil passages 42 and 43, formed in the cylinder head 26 and cam shaft 10, communicate with each other to allow the hydraulic pressure to reach the pressure chamber 39. An oil passage 44 formed in parts of the pulley 12 and cam shaft 10 allows oil, leaked from the hydraulic pressure chamber 39, to be supplied to the spring chamber 41. A recovery chamber 46, provided between the pulley 12 and the cylinder head 26, communicates with the oil passage 44 to recover the oil flowing from the oil passage 44. A return hole 48, formed in a part of the cylinder head 26 under the cam shaft 10, returns the oil, recovered in the recovery chamber 46, to the oil pan 28. A head cover 49 covers the top of the cylinder head 26. Another oil passage formed in the cylinder head 26 supplies the lubricating oil to the journal 10a.

In this embodiment, the lubricating oil of the engine 1 is used to drive the VVT 25. As shown in FIGS. 1 and 2, the oil pan 28, oil pump 29, oil filter 30, etc. constitute the lubricating apparatus for the engine 1. When the engine 1 operates, the oil pump 29 pumps oil out of the oil pan 28 and provides the oil to the oil filter 30.

A linear solenoid valve (LSV) 53, provided in a main oil passage 54 between the oil pump 29 and the oil passage 42, controls the hydraulic pressure supplied to the hydraulic pressure chamber 39 of the VVT 25. The duty ratio of this LSV 53 is controlled by an energization signal in such a manner that an increase in duty ratio increases the angle of the LSV 53. This increases the hydraulic pressure supplied from the main oil passage 54 through the oil passages 42 and 43 to the hydraulic pressure chamber 39. The hydraulic pressure pushes the ring gear 38 rightward in FIG. 2 against the urging force of the spring 40. When the hydraulic pressure is high, the cam shaft 10 rotates relative to the pulley 12, causing the rotational phase of the cam shaft 10 to lead the pulley 12. As a result, the timing of the intake valve 8 changes, significantly altering the level of the valve overlap between the intake valve 8 and the exhaust valve 9.

A relief valve (not shown) is connected between the oil pump 29 and the LSV 53. When a high hydraulic pressure exists between the oil pump 29 and the LSV 53, the relief valve allows the hydraulic pressure to escape.

When the LSV 53 is disabled, the supply of the hydraulic pressure to the oil passages 42 and 43 from the main oil passage 54 is blocked. This allows the hydraulic pressure to be released from the hydraulic pressure chamber 39. The ring gear 38 is in turn returned leftward in FIG. 2 by the force of the spring 40. Accordingly, when the hydraulic pressure is low, the cam shaft 10 rotates relative to the pulley 12 in a direction opposite to that under high hydraulic pressure conditions. This, in turn, causes the cam shaft 10 to return to a position, where the cam 10 was initially when there was no hydraulic pressure. As a result, the timing of the intake valve 8 changes, altering the level of the valve overlap. At this time, the oil leaking into the spring chamber 41 from the hydraulic pressure chamber 39 is communicated via the oil passage 44 to the recovery chamber 46 and is then returned to the oil pan 28 through the return hole 48.

A cam angle sensor 78, provided near the cam shaft 10 as shown in FIG. 1, detects the actual rotational angle of the cam shaft 10 i.e., the cam angle θCAM. When the rotational phase of the cam shaft 10 changes to the lead or lagging angle side due to the VVT 25, this sensor 78 detects the actual cam angle θCAM and outputs a signal corresponding to the detected value. In this embodiment, a hydraulic pressure sensor 79 detects the pressure of the oil, PO, pumped out by the oil pump 29, and outputs a signal corresponding to the detected value. Further, a diagnostic lamp 51 provided on an instrument panel (not shown) at the driver's seat is lit to inform the driver of an abnormality in the VVT 25, if occurred, as will be described later, in this embodiment.

As shown in FIG. 1, an electronic control unit (ECU) 80 receives signals output from the aforementioned various sensors 71 to 79. Based on those input signals, the ECU 80 controls the driving of the individual injectors 16, the igniter 22, the ISCV 24 and the LSV 53. Based on the signals from the individual sensors 71–79, the ECU 80 determines the occurrence of an abnormality in the VVT 25 and turns on the diagnostic lamp 51 as needed.

Figure 3:
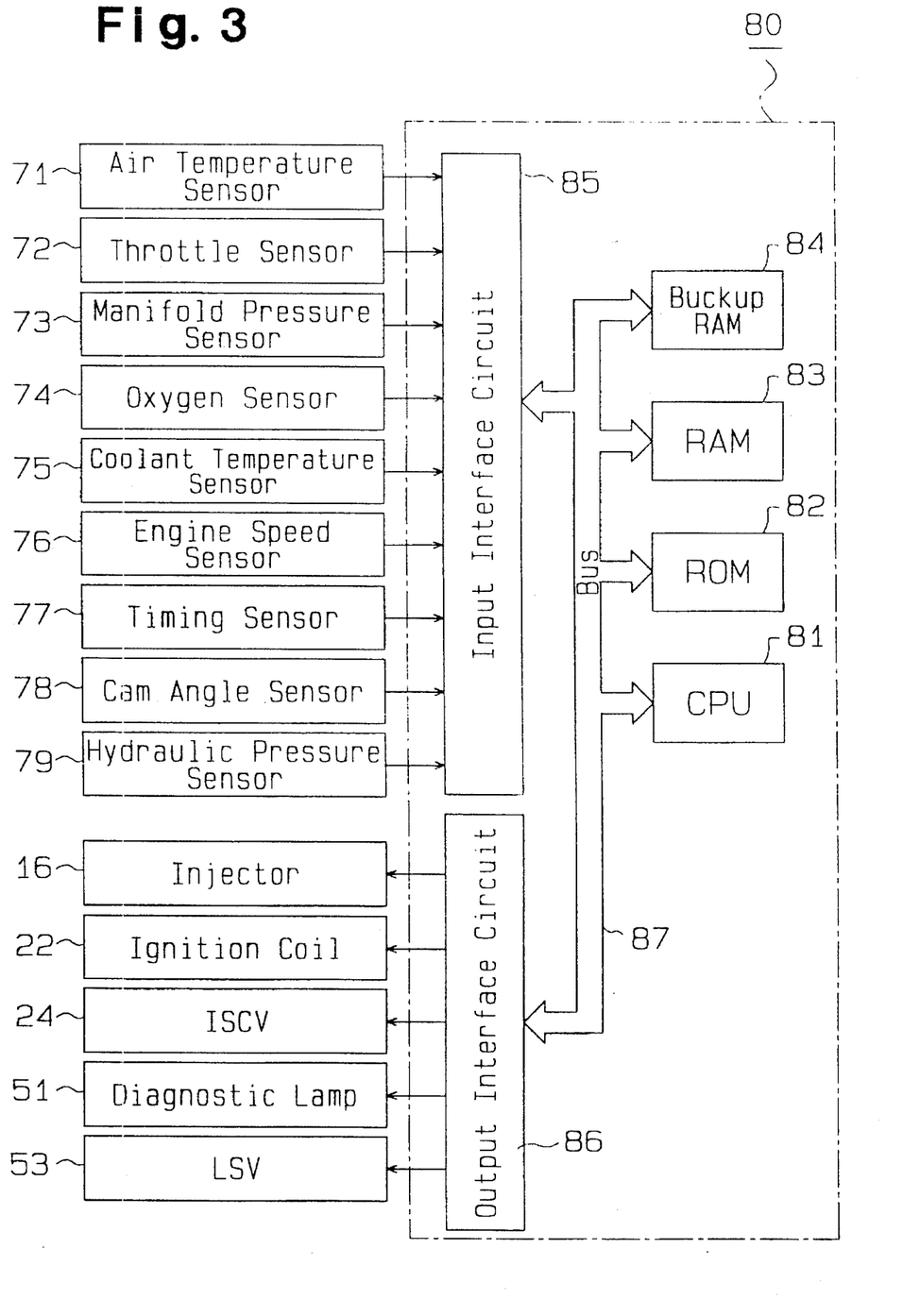
FIG. 3 is a block diagram showing the structures of an electronic control unit (ECU), etc.

The ECU 80 comprises a central processing unit (CPU) 81, a read only memory (ROM) 82, a random access memory (RAM) 83 and a backup RAM 84 as shown in a block diagram in FIG. 3. The ECU 80 has those components 81–84 connected to an input interface circuit 85 including an A/D converter and an output interface circuit 86 by a bus 87, thus constituting an arithmetic logic unit. Predetermined control programs, etc. are previously stored in the ROM 82. The RAM 83 temporarily stores the results of the operations performed by the CPU 81. The backup RAM 84 holds previously stored data. The aforementioned individual sensors 71 to 79 connect to the input interface circuit 85, while the components 16, 22, 24, 51 and 53 connect to the output interface circuit 86.

The CPU 81 reads the signals from the sensors 71–79, input via the input interface circuit 85, as input values. Based on the input values, the CPU 81 controls the driving of the individual components 16, 22, 24, 53, etc. to execute various controls, such as the fuel injection control, ignition timing control, idle speed control and valve timing control. Based on the signals from the individual sensors 71–79, the CPU 81 determines the occurrence of an abnormality in the VVT 25, turns on the diagnostic lamp 51 as needed, and stores data about the occurrence of the abnormality, in the backup RAM 84.

Figure 4:
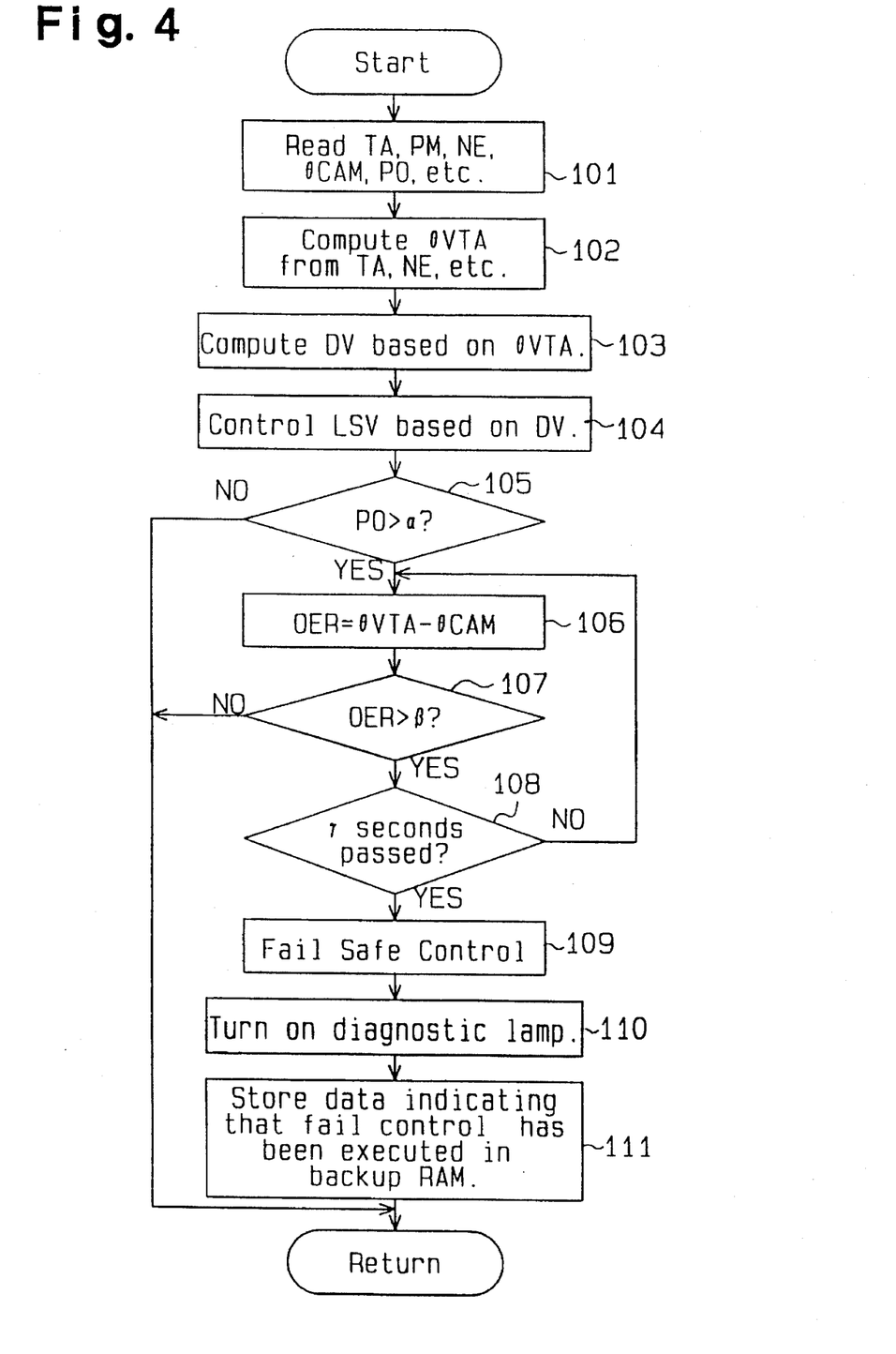
FIG. 4 is a flowchart illustrating a "valve timing control routine" executed by the ECU.

Of those various controls that are executed by the ECU 80, the contents of the valve timing control will be described with reference to FIG. 4. FIG. 4 presents a flowchart which illustrates a "valve timing control routine" that is executed to alter the timing of the intake valve 8. The ECU 80 periodically executes this routine.

At the beginning of this routine, first, the ECU 80 first receives input values associated with the throttle angle TA, manifold pressure PM, engine speed NE, cam angle θCAM, hydraulic pressure PO, etc. based on the signals from the individual sensors 72, 73, 76, 78, 79, etc. at step 101.

At step 102, the ECU 80 computes a lead angle value θVTA, as a target value for the valve timing according to the current running condition, based on the currently read input values of the throttle angle TA, engine speed NE and so forth. The ECU 80 calculates this lead angle value θVTA referring to a map of lead angle data (not shown), previously stored in ROM 82. This data comprises variations in the parameters TA, NE, etc.

At step 103, the ECU 80 computes a target control value DV to control the LSV 53 based on the currently computed lead angle value θVTA. The ECU 80 calculates this target control value DV referring to a control value map (not shown), which is determined previously with respect to the level of the lead angle value θVTA and stored in the ROM 82.

At step 104, the ECU 80 controls the duty ratio of the LSV 53 based on the currently computed target control value DV. Next, the ECU 80 determines if the currently read value of the hydraulic pressure PO is greater than a predetermined reference value $\alpha$ at step 105. This reference value $\alpha$ is relatively low as the value of the hydraulic pressure PO, and can be set to, for example, "0.5 Kg/cm$^2$". When the value of the hydraulic pressure PO is equal to or smaller than the reference value $\alpha$, which means that the hydraulic pressure PO is too low to promptly operate the VVT 25, the ECU 80 temporarily terminates the subsequent processing.

When the value of the hydraulic pressure PO is greater than the reference value α, which means that the hydraulic pressure PO is high enough to promptly operate the VVT 25, the ECU 80 proceeds to step 106. At step 106, the ECU 80 computes the difference, OER, between the target lead angle value θVTA and the actual cam angle value θCAM.

At the next step 107, the ECU 80 determines if the computed difference OER is greater than a predetermined reference value β, which can be set to, for example, "5 degrees". When the value of the difference OER is equal to or smaller than the reference value D, which means that the timing of the intake valve 8 has been changed properly, the ECU 80 temporarily terminates the subsequent processing. If the value of the cam angle θCAM is significantly different from the lead angle value θVTA and the difference OER is greater than the reference value D, the ECU 80 proceeds to step 108.

At step 108, the ECU 80 determines whether or not a predetermined time β has passed after the control of the LSV 53 started. This occurs when valve timing adjusts the lead angle value θVTA. The predetermined value y can be set to, for example, "10 sec". When the predetermined time γ has not passed from the start of the LSV control, the ECU 80 jumps to step 106 to repeat the processes of steps 106 to 108. If the difference OER becomes smaller than the reference value β before the predetermined time γ passes, during LSV control in steps 106–108, then the valve timing has been changed properly, and the ECU 80 leaves step 107 and temporarily terminates the subsequent processing. When the predetermined time γ has passed without the difference OER decreasing below the reference value β, then the valve timing has not been changed properly. If so, the ECU 80 determines that an abnormality has occurred in the VVT 25, and proceeds to step 109.

At step 109, the ECU 80 executes a fail safe control routine on the VVT 25. In this routine, for example, the ECU 80 inhibits the switching of the LSV 53 thereby preventing the switching of the actuation of the VVT 25. This fixes the value of the valve timing regardless of the engine's operating condition. In another fail safe routine, the ECU 80 may control the switching of the LSV 53 in such a way that the valve timing takes an intermediate value between the maximum lead and lag angle values.

At the subsequent step 110, the ECU 80 turns on the diagnostic lamp 51 to inform the driver, etc. of the occurrence of an abnormality in the VVT 25. At the next step 111, the ECU 80 stores data indicating that the fail safe routine has been executed due to the occurrence of an abnormality in the VVT 25, in the backup RAM 84, and temporarily terminates the subsequent processing. The ECU 80 executes the valve timing control in the above manner.

A description will now be given of the operation and advantages of the valve timing control apparatus with the above-described structure. While the engine 1 is running, both valves 8 and 9 operate at predetermined timings in synchronism with the rotation of the crankshaft 1a or the reciprocating movement of each piston 3. Then, both ports 6a and 7a are opened and closed to respectively allow intake and exhaust gasses in and out of the combustion chamber 4. This occurs in synchronism with a series of operational strokes of the engine 1. The valve timing of the intake valve 8 is controlled in accordance with the running condition of the engine 1. More specifically, the ECU 80 computes the lead angle value θVTA as the target value for the valve timing based on the engine speed NE, etc. To change the actual valve timing to the lead angle value θVTA, the ECU 80 controls the LSV 53 based on the target control value DV, which has been computed based on the value θVTA. Through this control, the VVT 25 is driven on the basis of the pressure of the oil, PO, supplied from the oil pump 29, thus changing the timing of the intake valve 8.

When the oil pump 29 functions properly and the value of the hydraulic pressure PO is greater than the reference value α, it is determined whether the difference OER between the actual cam angle θCAM and the target lead angle value θVTA is equal to or greater than the reference value β. If the difference OER exceeds the reference value α and if the predetermined time γ has passed, the value of the actual cam angle θCAM deviates significantly from the target lead angle value θVTA. This will happen even though the value of the hydraulic pressure PO has exceeded the reference value α. The ECU 80 then determines that an abnormality has occurred in the VVT 25, allowing for execution of the fail safe routine. When the value of the hydraulic pressure PO, detected by the hydraulic pressure sensor 79, is determined to be equal to or smaller than the reference value α, it is considered that the engine speed NE is low, the pressure of the oil pumped out from the oil pump 29 is not sufficiently high, and the VVT 25 has not operated. Accordingly, the fail safe routine on the VVT 25 is suppressed.

In a situation where the hydraulic pressure PO from the oil pump 29 is low and the valve timing cannot promptly be changed to the target lead angle value θVTA, a fictitious or erroneous occurrence of VVT abnormality will not be determined, and the fail safe routine, accordingly, will not be executed. As described earlier, at low hydraulic pressure, it takes a specific amount of time to change the valve timing to the target lead angle value θVTA. There is a possibility that although the VVT 25 is properly functioning, the ECU 80 will erroneously determine that an abnormality has occurred in the VVT 25. Consequently, the ECU 80 may execute the fail safe routine. According to this embodiment, however, when the engine 1 runs at a low speed so that the hydraulic pressure PO is lower than the reference value α, the determination of an abnormality in the VVT 25 is inhibited. This prevents the actuation of the VVT 25 from being suppressed based on the erroneous determination. Consequently, the VVT 25 can be controlled at low engine speed conditions.

According to this embodiment, therefore, the time for determining an abnormality in the VVT 25 need not be set long. Accordingly, it is possible to determine VVT abnormalities only during high engine speed high hydraulic pressure conditions. When the VVT 25 operates properly, the fail safe routine is not executed. This promotes optimal valve timing control, irrespective of engine operating conditions.

Second Embodiment

Figure 5:
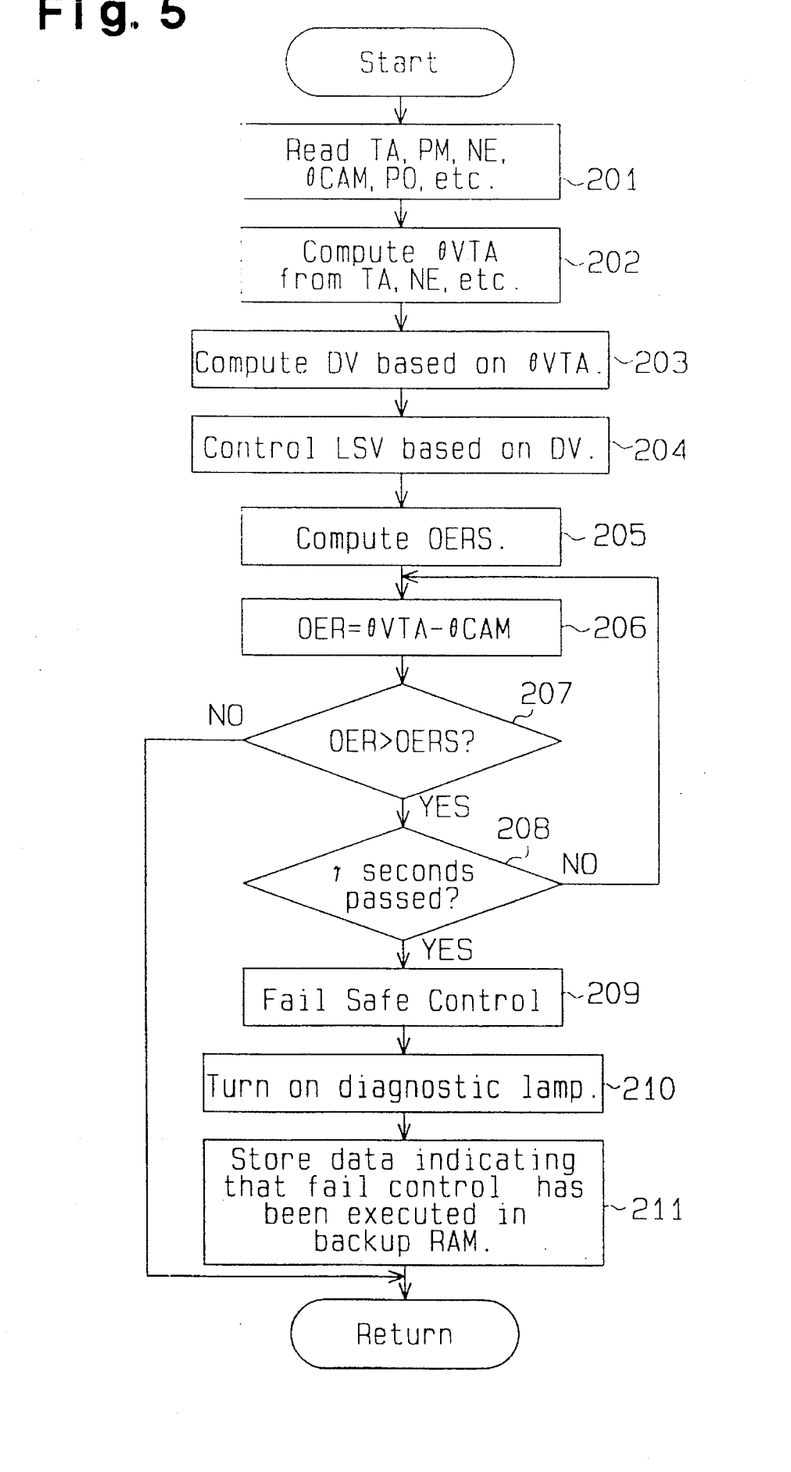
FIG. 5 is a flowchart illustrating a "valve timing control routine" executed by the ECU.

A second embodiment of the present invention as adapted for a gasoline engine system of a vehicle will now be described with reference to FIGS. 5 and 6. It should be noted that the description of this embodiment is made particularly on the portion different from the description in the first embodiment.

The second embodiment differs from the first embodiment in the contents of the valve timing control. FIG. 5 presents the flowchart which illustrates a "valve timing control routine" periodically executed by the ECU 80.

When entering this routine, the ECU 80 executes a sequence of processes at steps 201 to 204. Since the processes at steps 201–204 are the same as the processes at steps 101–104 in the flowchart of the first embodiment in FIG. 4, their description will not be given here.

At the subsequent step 205, the ECU 80 computes the value of a target difference OERS which indicates the allowable range in accordance with the currently read value of the hydraulic pressure PO. The ECU 80 computes the value of the target difference OERS by referring to a target difference map as shown in FIG. 6, predetermined in accordance with the level of the hydraulic pressure PO and stored in the ROM 82 previously. This target difference map is prepared in such a way that when a decreasing hydraulic pressure PO is equal to or smaller than a predetermined value δ, the target difference OERS becomes larger. When however the hydraulic pressure is greater than the predetermined value δ, the target difference OERS becomes constant at a certain level. This predetermined value 6 can be set to, for example, "0.5 Kg/cm$^2$".

At the next step 206, the ECU 80 computes the actual difference OER between the target lead angle value θVTA and the actual cam angle value θCAM. At step 207, the ECU 80 determines if the currently computed value of the difference OER is greater than the currently computed value of the target difference OERS. When the value of the actual difference OER is not greater than the value of the target difference OERS, which means that the timing of the intake valve 8 has been changed properly, the ECU 80 temporarily terminates the subsequent processing. If the value of the actual difference OER is equal to or greater than the value of the target difference OERS, the ECU 80 proceeds to step 208.

At step 208, when valve timing is adjusted to the lead angle value θVTA, the ECU 80 determines whether or not the predetermined time γ has passed after the control of the LSV 53 started. When the predetermined time γ has not passed since the start of the control of the LSV 53, the ECU 80 returns to step 206 to repeat the processes of steps 206 to 208. Valve timing has been changed properly if the value of the actual difference OER becomes equal to or smaller than the value of the target difference OERS, before the predetermined time γ passes since the start of the control of the LSV 53 in the sequence of processes at steps 206–208. In this event, the ECU 80 leaves step 207 and temporarily terminates the subsequent processing. On the other hand, valve timing has not been changed properly when the value of the actual difference OER is greater than the value of the target difference OERS and the predetermined time γ has passed since the start of the control of the LSV 53. When this happens, the ECU 80 determines that an abnormality has occurred in the VVT 25, and proceeds to step 209 to execute a sequence of processes at steps 209–211.

At steps 209–211, the ECU 80 executes the same sequence of processes at steps 109–111 in the flowchart of the first embodiment in FIG. 4 and temporarily terminates the subsequent processing.

Figure 6:
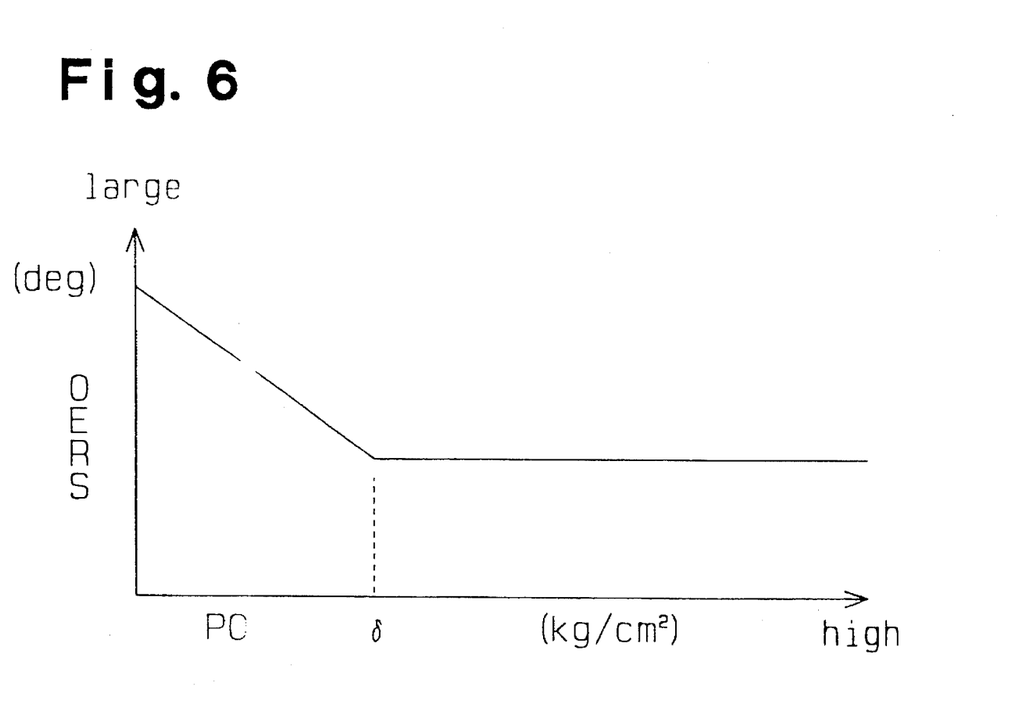
FIG. 6 is a graph showing the relation between hydraulic pressure and a target difference.

In this embodiment unlike the first embodiment, as described above, the value of the target difference OERS for the level of the hydraulic pressure PO is computed on the basis of the target difference map shown in FIG. 6. Further, the actual difference OER between the actual cam angle θCAM and the target lead angle value θVTA is computed. When the value of the actual difference OER is greater than the value of the target difference OERS, it is determined that an abnormality has occurred in the VVT 25, and the fail control or the like is executed.

Should the hydraulic pressure PO becomes low, the target difference map in this embodiment is prepared in such a manner that as the hydraulic pressure PO becomes lower, the value of the target difference OERS becomes larger. According to the first embodiment, should the actuation of the VVT 25 become slow due to a low hydraulic pressure PO, abnormality determinations are inhibited. According to the second embodiment, however, the target difference OERS is set larger when the hydraulic pressure PO drops and when the engine 1 runs at a low speed. Thus, even under low hydraulic pressure PO and slow VVT operation, it is possible to properly determine an abnormality in the VVT 25. When the hydraulic pressure PO is low so that it takes a certain time for the value of the actual cam angle θCAM to reach the target lead angle value θVTA, the value of the actual difference OER lies within the allowable range with the target difference OERS as a reference. It can be determined that an abnormality has occurred in the VVT 25 only when the value of the actual difference OER exceeds the target difference OERS.

The advantage of the second embodiment, as described above, is that false readings or erroneous detections of VVT abnormalities can be prevented. In addition, according to this embodiment, the value of the target difference OERS is set relatively low to cope with the case where the hydraulic pressure PO given to the VVT 25 becomes high or the engine 1 runs at a high speed. With the engine 1 running at a high speed, it is possible to properly determine that an abnormality has occurred in the VVT 25 only when the value of the actual difference OER becomes large. When the VVT 25 functions properly, the fail safe routine will be suppressed.

It is therefore possible to always control the valve timing to the optimal state in accordance with the running condition of the engine 1, thus preventing the deterioration of the drivability of the engine 1.

Although only two embodiments of the present invention have been described herein, it should be apparent to those skilled in the art that the present invention may be embodied in many other specific forms without departing from the spirit or scope of the invention. Particularly, it should be understood that this invention may be embodied in the following modes.

Figure 7:
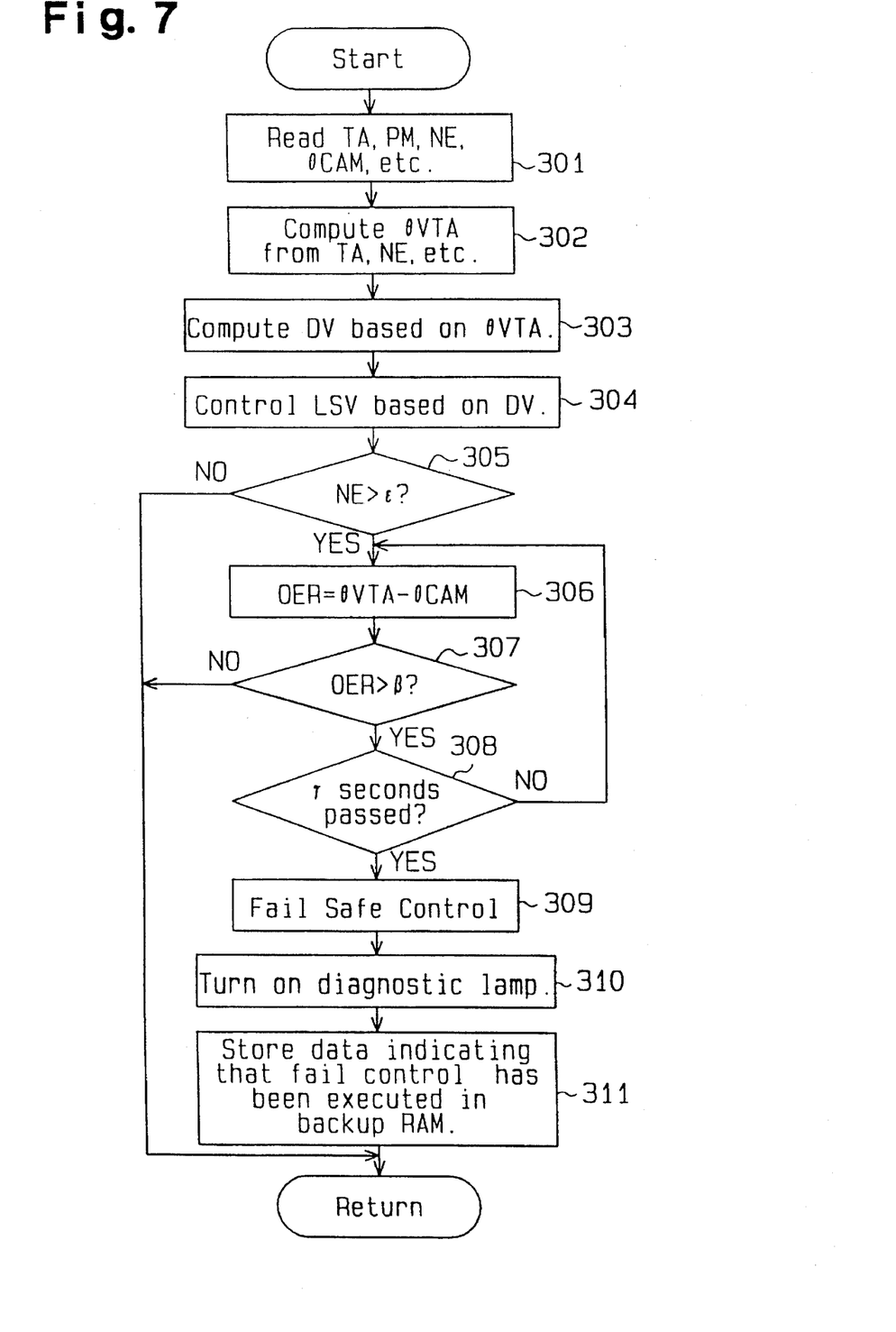
FIG. 7 is a flowchart illustrating a "valve timing control routine" executed by the ECU according to another embodiment of this invention.

In the first and second embodiments, detected hydraulic pressure PO communicated to the VVT 25 from the oil pump 29 forms the basis for determining that an abnormality exists in the VVT 25. The valve timing control apparatus may however be designed in such a fashion that an abnormality in the VVT 25 is determined based on the engine speed NE as illustrated in a flowchart (step 305) in FIG. 7. More specifically, due to the fact that the hydraulic pressure PO becomes low as the engine speed NE gets low, the determination of an abnormality in the VVT 25 need not be performed at step 305 in FIG. 7 when the engine speed NE is equal to or lower than a predetermined value ε. VVT abnormality determinations can be made when the engine speed NE is higher than the predetermined value ε at step 305. This structure can provide the same advantages as the above-described two embodiments.

Although the VVT 25 described in the above two embodiments, is driven by hydraulic pressure, it may be driven by an actuator such as a stepping motor. In this case, the abnormality determinations could be made on the basis of the value of the voltage supplied to the stepping motor.

While the above embodiments are applied to the valve timing control apparatus which has the VVT 25 that alters only the timing of the intake valve 8, this invention may be applied to the case of using a VVT which alters the valve timing of the exhaust valve 9 or the case of using a VVT which alters the valve timings of both the intake valve 8 and exhaust valve 9.

Although the valve timing control apparatus of the present invention is applied to a gasoline engine system in the above-described embodiments, this apparatus may be adapted for a Diesel engine system.

According to the individual embodiments, when the occurrence of an abnormality in the VVT 25 is determined, the fail safe routine is executed to control the VVT 25. A diagnostic lamp 51 is also turned on and the diagnostic results are stored in the backup RAM 84. Alternatively, when an abnormality in the VVT 25 is determined, however, only the fail safe routine VVT 25 need be performed. The processes of turning on the diagnostic lamp 51 and storing the decision result in the backup RAM 84 may be omitted.

Therefore, the present examples and embodiments are to be considered as illustrative and not restrictive and the invention is not to be limited to the details given herein, but may be modified within the scope of the appended claims.

What is claimed is:

1. A valve timing control apparatus for an engine having a combustion chamber communicating with an air-intake passage and an air-exhaust passage, said air-intake passage being arranged to introduce air to the chamber through a throttle valve for regulating an amount of the air with an opening degree thereof, said air-exhaust passage being arranged to exhaust gas from the chamber, both passages respectively having an intake valve and an exhaust valve therein, said intake and exhaust valves alternately and selectively opening and closing, and simultaneously opening during a valve overlap period, in synchronism with a rotation of a crankshaft to open the passages to the combustion chamber, wherein said apparatus controls at least one of the valve timing of the intake valve or the valve timing of the exhaust valve in accordance with a running condition of the engine, said apparatus compromising:

adjusting means for adjusting at least one of the value timing of the intake valve or the valve timing of the exhaust value;

actuating means for actuating said adjusting means;

first detecting means for detecting an actual value of the valve timing adjusted by the adjusting means;

second detecting means for detecting a running condition of the engine;

computing means for computing a target value of the valve timing based on the detected running condition of the engine;

control means for controlling the actuating means to adjust the valve timing based on the computed target value; and third detecting means for detecting a magnitude of the actuating force applied to the adjusting means by the actuating means;

comparing means for comparing the actual value of the valve timing and the target value of the valve timing;

determining means for determining a malfunction of the adjusting means when the actual value differs from the target value by a predetermined value; and discontinuing means for discontinuing the operation of the determining means when the actuating force detected by the third detecting means is less than a predetermined value.

2. The apparatus according to claim 1, wherein said adjusting means includes:

a cam shaft rotatable with the crankshaft for actuating at least one of the intake valve or the exhaust valve;

a timing pulley provided on said cam shaft for transmitting torque of the crankshaft to the cam shaft;

a ring gear for coupling the cam shaft to the timing pulley to cause a rotational phase difference between the cam shaft and the timing pulley based on movement of the ring gear in an axial direction thereof; and wherein said actuating means includes a hydraulic pump for applying hydraulic pressure to the ring gear to drive the ring gear; and wherein said third detecting means includes a sensor for detecting the hydraulic pressure.

3. The apparatus according to claim 2, wherein said first detecting means includes a sensor for detecting a rotation angle of the camshaft.

4. The apparatus according to claim 1, wherein said second detecting means includes a first sensor for detecting the opening degree of the throttle valve and a second sensor for detecting a rotational speed of the engine, and wherein said computing means computes the target value based on one from a group consisting of an opening amount of the throttle valve and rotation speed of the engine.

5. The apparatus according to claim 1, wherein said determining means determines the malfunction of the adjusting means when a predetermined time lapses after the control means starts to control the actuating means.

6. The apparatus according to claim 1, wherein said discontinuing means suppresses a variation in the hydraulic pressure applied to the adjusting means from the actuating means to obtain constant valve timing independently from the running condition of the engine when the determining means determines the malfunction of the adjusting means.

7. The apparatus according to claim 1, wherein said computing means, said control means, said comparing means, said determining means and said discontinuing means incorporate an electronic control unit having an input signal processor, a memory, an operation circuit and an output signal processor.

8. A valve timing control apparatus for an engine having a combustion chamber communicating with an air-intake passage and an air-exhaust passage, said air-intake passage being arranged to introduce air to the chamber through a throttle valve for regulating an amount of the air with an opening degree thereof, said air-exhaust passage being arranged to exhaust gas from the chamber, both passages respectively having an intake valve and an exhaust valve therein, said intake and exhaust valves alternately and selectively opening and closing, and simultaneously opening during a valve overlap period, in synchronism with a rotation of a crankshaft to open the passages to the combustion chamber, wherein said apparatus controls at least one of the valve timing of the intake valve or the valve timing of the exhaust valve in accordance with a running condition of the engine, said apparatus comprising:

first adjusting means for adjusting at least one of the valve timing of the intake valve or the valve timing of the exhaust valve;

actuating means for actuating said adjusting means;

second adjusting means for adjusting an actuating force applied to the first adjusting means from the actuating means;

first detecting means for detecting an actual value of the valve timing adjusted by the first adjusting means;

second detecting means for detecting a running condition of the engine;

first computing means for computing a first target value of the valve timing based on the detected running condition of the engine;

second computing means for computing a second target value to control the second adjusting means;

control means for controlling the second adjusting means to adjust the valve timing based on the detected actual value of the valve timing and computed second target value; and third detecting means for detecting a magnitude of the actuating force applied to the first adjusting means by the actuating means;

third computing means for computing a deviation between the detected actual value of the valve timing and the computed first target value;

determining means for determining a malfunction of the first adjusting means when the deviation is in excess of a first predetermined value; and discontinuing means for discontinuing the operation of the determining means when the actuating force detected by the third detecting means is less than a second predetermined value.

9. The apparatus according to claim 8, wherein said first adjusting means includes:

a cam shaft rotatable in association with the crankshaft for actuating at least one of the intake valve or the exhaust valve;

a timing pulley provided on said cam shaft for transmitting torque of the crankshaft to the cam shaft;

a ring gear for coupling the cam shaft to the timing pulley to cause a rotational phase difference between the cam shaft and the timing pulley based on movement of the ring gear in an axial direction thereof; and wherein the actuating means includes a hydraulic pump for applying hydraulic pressure to the ring gear to drive the ring gear; and wherein the third detecting means includes a sensor for detecting the hydraulic pressure.

10. The apparatus according to claim 9, wherein said second adjusting means includes an electromagnetic valve for adjusting the hydraulic pressure.

11. The apparatus according to claim 9, wherein said first detecting means includes a sensor for detecting a rotation angle of the camshaft.

12. The apparatus according to claim 8, wherein said second detecting means includes a first sensor for detecting the opening degree of the throttle valve and a second sensor for detecting a rotational speed of the engine, and wherein said first computing means computes the target value based on one from a group consisting of an opening degree of the throttle valve and rotation speed of the engine.

13. The apparatus according to claim 9, wherein the first predetermined value is set to increase in proportion with decrease of the hydraulic pressure when the hydraulic pressure is lower than a third predetermined value.

14. The apparatus according to claim 8, wherein said determining means determines the malfunction of the first adjusting means when a predetermined time lapses after the control means starts to control the second adjusting means.

15. The apparatus according to claim 8, wherein said discontinuing means suppresses a variation in the hydraulic pressure applied to first adjusting means from the actuating means to obtain constant valve timing independently from the running condition of the engine when the determining means determines the malfunction of the adjusting means.

16. The apparatus according to claim 8, wherein said first, second and third computing means, said determining means, said control means and said discontinuing means incorporate an electronic control unit having an input signal processor, a memory, an operation circuit and an output signal processor.

* * * * *

UNITED STATES PATENT AND TRADEMARK OFFICE
CERTIFICATE OF CORRECTION

PATENT NO. : 5,529,034
DATED : 25 June 1996
INVENTOR(S) : Shigeru SONE et al.

It is certified that error appears in the above-indentified patent and that said Letters Patent is hereby corrected as shown below:

| Column | Line | |
|---|---|---|
| 4  | 13 | After "system." start new paragraph. |
| 8  | 38 | Change "8CAM" to --$\theta$ CAM--. |
| 9  | 11 | Change "value D" to --value $\beta$ --. |
| 9  | 16 | Change "value D" to --value $\beta$ --. |
| 9  | 19 | Change "time $\beta$ " to --time $\gamma$ --. |
| 9  | 21 | change "value y" to --value $\gamma$ --. |
| 11 | 16 | Change "value 6" to --value $\delta$ --. |

Signed and Sealed this

Twenty-second Day of October, 1996

*Attest:*

BRUCE LEHMAN

*Attesting Officer*   *Commissioner of Patents and Trademarks*